(12) United States Patent
Kwant et al.

(10) Patent No.: US 10,282,861 B2
(45) Date of Patent: May 7, 2019

(54) POSE ERROR ESTIMATION AND LOCALIZATION USING STATIC FEATURES

(71) Applicant: HERE GLOBAL B.V., Eindhoven (NL)

(72) Inventors: Richard Kwant, Oakland, CA (US); Anish Mittal, Berkeley, CA (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 15/375,513

(22) Filed: Dec. 12, 2016

(65) Prior Publication Data

US 2018/0165831 A1    Jun. 14, 2018

(51) Int. Cl.
| | | |
|---|---|---|
| *G06T 7/00* | (2017.01) | |
| *G06T 7/73* | (2017.01) | |
| *G01S 19/40* | (2010.01) | |
| *G01S 19/47* | (2010.01) | |
| *G05D 1/02* | (2006.01) | |

(52) U.S. Cl.
CPC .............. *G06T 7/74* (2017.01); *G01S 19/40* (2013.01); *G01S 19/47* (2013.01); *G05D 1/027* (2013.01); *G05D 1/0251* (2013.01); *G05D 1/0278* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,174,568 B2 | 5/2012 | Samarasekera et al. | |
| 9,110,470 B2 | 8/2015 | Karlsson et al. | |
| 9,194,949 B2 | 11/2015 | Becker et al. | |
| 9,218,529 B2 | 12/2015 | Lewis et al. | |
| 9,342,888 B2 | 5/2016 | Menashe et al. | |
| 2005/0190972 A1* | 9/2005 | Thomas | G06K 9/209 382/218 |
| 2014/0072169 A1* | 3/2014 | Haas | G06T 7/0044 382/103 |
| 2014/0241617 A1 | 8/2014 | Shotton et al. | |

(Continued)

FOREIGN PATENT DOCUMENTS

| | | |
|---|---|---|
| EP | 1898181 A1 | 3/2008 |
| WO | WO 2009/018538 A2 | 2/2009 |

OTHER PUBLICATIONS

Pinho, Fábio Filipe Costa; Improving Geolocation by Combining GPS with Image Analysis, Master's Thesis for Computer Engineering and Computing at the University of Porto, Portugal, Jul. 12, 2013, retrieved from < https://repositorio-aberto.up.pt/bitstream/10216/72657/1/000157891.pdf> on Mar. 7, 2017.

(Continued)

*Primary Examiner* — Delomia L Gilliard
(74) *Attorney, Agent, or Firm* — Alston & Bird LLP

(57) ABSTRACT

The position and/or pose of a vehicle is determined in real time. An observed position and an observed pose of a vehicle are determined. A reference image is generated based on the observed position and the observed pose. The reference image comprises one or more reference static features. A captured image and the reference image are implicitly compared. Based on a result of the comparison, a correction to the observed position, the observed pose, or both is determined.

20 Claims, 7 Drawing Sheets

(56) References Cited

U.S. PATENT DOCUMENTS

| | | |
|---|---|---|
| 2014/0249752 A1 | 9/2014 | Napier et al. |
| 2015/0228077 A1 | 8/2015 | Menashe et al. |
| 2016/0005164 A1* | 1/2016 | Roumeliotis ........ G01C 21/165 348/116 |

OTHER PUBLICATIONS

Durrant-Whyte, Hugh, et al., "Simultaneous Localisation and Mapping (SLAM): Part I The Essential Algorithms", *robotics and Automation Magazine*, Jun. 2006, 9 pages, retrieved from <http://www-personal.acfr.usyd.edu.au/tbailey/papers/slamtute1.pdf> on Mar. 2, 2017.

Lowe, David G., "Object Recognition from Local Scale-Invariant Features", Proceedings of the Seventh IEEE International Conference on Computer Vision, Corfu, Sep. 1999, 8 pages, vol. 2, retrieved from <http://www.cs.ubc.ca/~lowe/papers/iccv99.pdf> on Mar. 2, 2017.

U.S. Appl. No. 15/355,727, "Detection of Invariant Features for Localization", Unpublished (filing date Nov. 18, 2016), (Richard Kwant, Inventor) (Here Global B.V., assignee).

European Patent Office, Extended European Search Report for Application No. 17195255.9, dated Apr. 9, 2018, 8 pages, Germany.

* cited by examiner

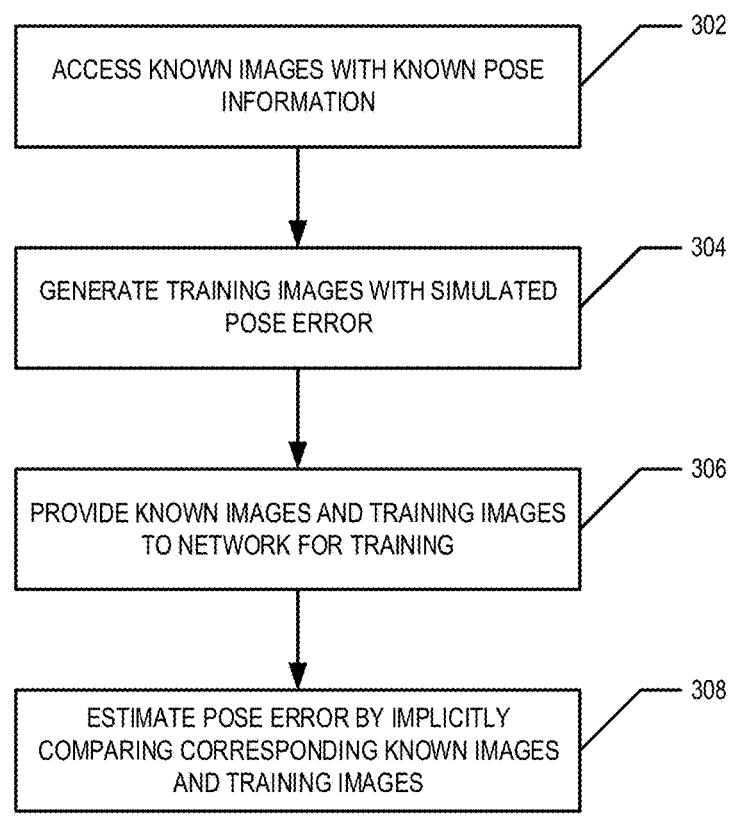

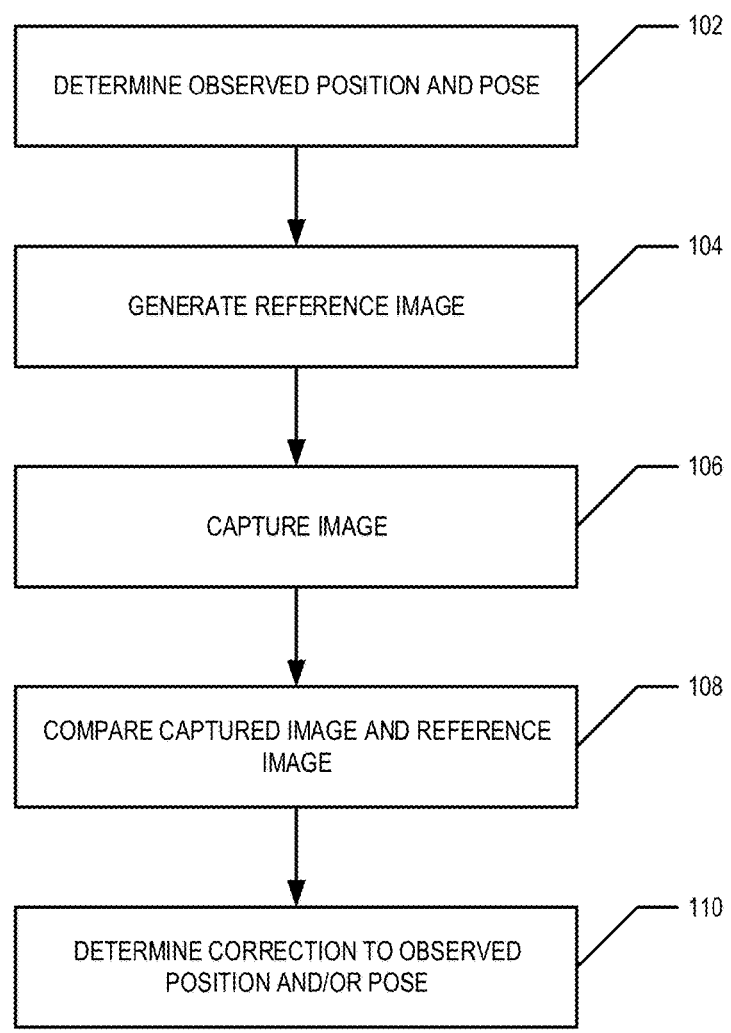

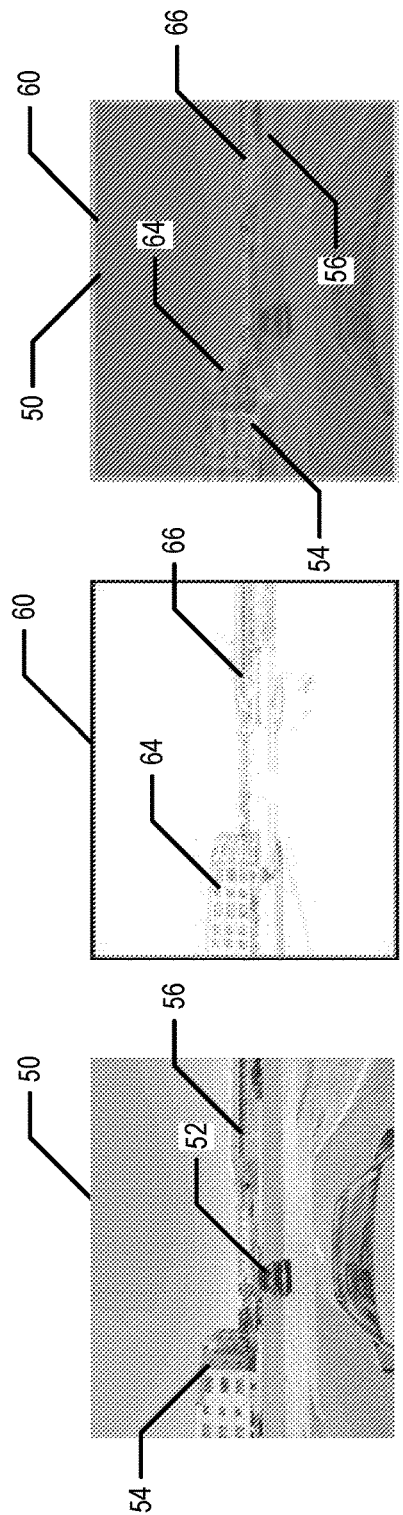

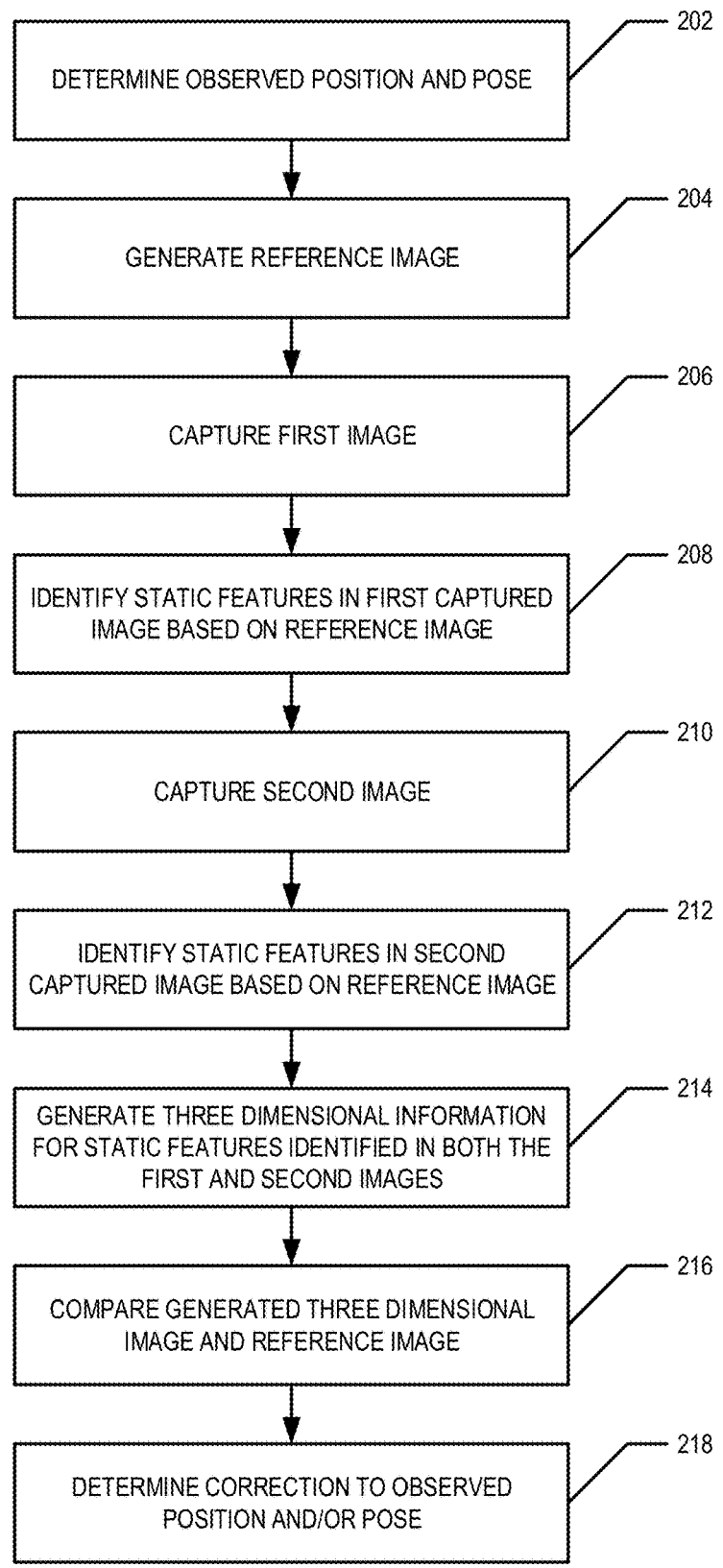

POSE ERROR ESTIMATION AND LOCALIZATION USING STATIC FEATURES

TECHNOLOGICAL FIELD

An example embodiment relates generally to localization. In particular, an example embodiment generally relates to localization for enabling autonomous and/or assisted driving.

BACKGROUND

Autonomous driving requires high accuracy, real-time localization of vehicles. Currently, most vehicle navigation has been accomplished using a global positioning system (GPS), which provides a real-time location with a 95% confidence interval of 7.8 meters, according to the US government. However, in complicated urban environments, reflection in GPS signals can further increase this error, such that a determined location may be off by as much as 30 meters. Given that the width of many lanes is only 3 to 4 meters, this accuracy is not sufficient to properly localize an autonomous vehicle so that it can make safe route planning decisions. Other sensors, such as inertial measurement units (IMUs) can increase the accuracy of localization by taking into account vehicle movement, but these sensors tend to drift and still do not provide sufficient accuracy for localization. In general, the industry recognizes that a localization accuracy of around 10 cm is desired for autonomous driving in many areas.

BRIEF SUMMARY

At least some example embodiments allow for an accurate, real time (or near real time) determination of a location and/or pose of a vehicle. In particular, methods, apparatus, and computer program products are provided in accordance with an example embodiment in order to provide accurate, real time (or near real time) determinations of a vehicle's position and/or pose. An observed position and an observed pose of a vehicle is determined. In certain embodiments, a captured image is captured by an image capturing device disposed on the vehicle. A reference image is generated based on the observed position and pose. The reference image comprises one or more reference static features. The reference image and the captured image are implicitly compared. Based on a result of the comparison, a correction to the observed position, the observed pose, or both is determined by the pose error network.

In accordance with an example embodiment, a method is provided that comprises determining an observed position and an observed pose of a vehicle. In certain example embodiments, a captured image is captured by an imaging capturing device onboard the vehicle. The method further comprises generating a reference image based on the observed position and pose. The reference image comprises one or more reference static features. The method further comprises implicitly comparing the reference image and the captured image. The method further comprises, based on a result of the comparison, determining, by a pose error network, a correction to the observed position, the observed pose, or both.

In at least some example embodiments, the reference image comprises a binary map that is a two dimensional projection of a three dimensional feature map at the observed position and observed pose. In example embodiments, the captured image comprises multi-channel color information. In an example embodiment, the observed position is based on a position determined by a global positioning system (GPS), a position determined by an inertial measurement unit (IMU), or a combination thereof. In an example embodiment, the reference image is generated based on reference static feature information that comprises ground truth information for one or more reference static features.

In certain example embodiments, the method further comprises selecting and/or querying one or more reference static features from a plurality of reference static features stored in association with a digital database, library, and/or map tile of a digital map based on the observed position, observed pose, or both. The method may further comprise accessing reference static feature information corresponding to the selected reference static features from the map tile; and generating a three dimensional feature map based on the accessed reference static feature information; and generating the reference image, wherein the reference image is a two dimensional projection of the three dimensional feature map based on the observed position, observed pose, or both.

In an example embodiment, the method further comprises capturing at least one second captured image that substantially overlaps with the captured image. In an example embodiment, the method further comprises identifying one or more static features within the captured image; and identifying one or more static features within a second captured image. The one or more static features identified within the second captured image comprises at least one static feature that was identified in the captured image. In an example embodiment, the method further comprises generating three dimensional information corresponding to at least one static feature identified in both the captured image and the second captured image based at least in part on the captured image and the second captured image; and generating a three dimensional image based at least in part on the three dimensional information. The method further comprises determining a correction to the observed position, the observed pose, or both. The correction may be determined by the pose error network based on based on implicitly comparing the generated three dimensional image and the reference image.

In accordance with an example embodiment, an apparatus is provided that comprises at least one processor, at least one memory storing computer program code, and a pose error network, with the at least one memory and the computer program code configured to, with the processor, cause the apparatus to at least determine an observed position and an observed pose of a vehicle. In certain embodiments, the at least one memory and the computer program code are configured to, with the processor, cause the capture of a captured image using an image capturing device on board the vehicle. The at least one memory and the computer program code are further configured to, with the processor, cause the apparatus to at least generate a reference image based on the observed position and pose. The reference image comprises one or more reference static features. The at least one memory and the computer program code are configured to, with the processor, cause the apparatus to at least implicitly compare the reference image and the captured image and, based on a result of the comparison, determine, by the pose error network, a correction to the observed position, the observed pose, or both.

In an example embodiment, the reference image is a binary map that is a two dimensional projection of a three dimensional feature map at the observed position and observed pose. In example embodiments, the captured image comprises multi-channel color information. In an example embodiment, the observed position is based on a position determined by a global positioning system (GPS), a position determined by an inertial measurement unit (IMU), or a combination thereof. In certain example embodiments, the reference image is generated based on reference static feature information that comprises ground truth information for one or more reference static features.

In an example embodiment, the at least one memory and the computer program code are further configured to, with the processor, cause the apparatus to at least select one or more reference static features from a plurality of reference static features stored in association with a map tile of a digital map based on the observed position, observed pose, or both. The at least one memory and the computer program code may be further configured to, with the processor, cause the apparatus to at least access reference static feature information corresponding to the selected reference static features from the map tile; and generate a three dimensional feature map based on the accessed reference static feature information; and generate the reference image, wherein the reference image is a two dimensional projection of the three dimensional feature map based on the observed position, observed pose, or both.

In an example embodiment, the at least one memory and the computer program code are further configured to, with the processor, cause the apparatus to capture at least one second captured image that substantially overlaps with the captured image. In an example embodiment, the at least one memory and the computer program code are further configured to, with the processor, cause the apparatus to identify one or more static features within the captured image; and identify one or more static features within the second captured image. The one or more static features identified within the second captured image comprises at least one static feature that was identified in the captured image. In an example embodiment, the at least one memory and the computer program code are further configured to, with the processor, cause the apparatus to generate three dimensional information corresponding to at least one static feature identified in both the captured image and the second captured image based at least in part on the captured image and the second captured image; and generate a three dimensional image based at least in part on the three dimensional information. The at least one memory and the computer program code are further configured to, with the processor, cause the apparatus to determine, by the pose error network, a correction to the observed position, the observed pose, or both. The correction may be determined based on implicitly comparing the generated three dimensional image and the reference image.

In accordance with an example embodiment, a computer program product is provided that comprises at least one non-transitory computer-readable storage medium having computer-executable program code instructions stored therein with the computer-executable program code instructions comprising program code instructions configured to determine an observed position and an observed pose of a vehicle. In certain embodiments, the program code instructions comprise program code instructions configured to cause the capture of a captured image using an image capturing device on board the vehicle. The computer-executable program code instructions further comprise program code instructions configured to generate a reference image based on the observed position and pose. The reference image comprises one or more reference static features. The computer-executable program code instructions further comprise program code instructions configured to implicitly compare the reference image and the captured image and, based on a result of the comparison, determine, by a pose error network, a correction to the observed position, the observed pose, or both.

In an example embodiment, the reference image is a binary map that is a two dimensional projection of a three dimensional feature map at the observed position and observed pose. In example embodiments, the captured image comprises multi-channel color information. In certain example embodiments, the observed position is based on a position determined by a global positioning system (GPS), a position determined by an inertial measurement unit (IMU), or a combination thereof. In an example embodiment, the reference image is generated based on reference static feature information that comprises ground truth information for one or more reference static features.

In certain example embodiments, the computer-executable program code instructions further comprise program code instructions configured to select one or more reference static features from a plurality of reference static features stored in association with a map tile of a digital map based on the observed position, observed pose, or both. The computer-executable program code instructions further comprise program code instructions configured to access reference static feature information corresponding to the selected reference static features from the map tile; and generate a three dimensional feature map based on the accessed reference static feature information; and generate the reference image, wherein the reference image is a two dimensional projection of the three dimensional feature map based on the observed position, observed pose, or both.

In an example embodiment, the computer-executable program code instructions further comprise program code instructions configured to cause the capture of at least one second captured image that substantially overlaps with the captured image; identify one or more static features within the captured image; and identify one or more static features within the second captured image. The one or more static features identified within the second captured image comprises at least one static feature that was identified in the captured image. In an example embodiment, the computer-executable program code instructions further comprise program code instructions configured to generate three dimensional information corresponding to at least one static feature identified in both the captured image and the second captured image based at least in part on the captured image and the second captured image; and generate a three dimensional image based at least in part on the three dimensional information. The computer-executable program code instructions further comprise program code instructions configured to determine, by the pose error network, a correction to the observed position, the observed pose, or both. The correction may be determined based on implicitly comparing the generated three dimensional image and the reference image.

In accordance with yet another example embodiment of the present invention, an apparatus is provided that comprises means for determining an observed position and an observed pose of a vehicle. In certain embodiments, the apparatus comprises means for capturing a captured image. The apparatus further comprises means for generating a reference image based on the observed position and observed pose. The reference image comprises one or more reference static features. The apparatus further comprises means for implicitly comparing the reference image to the captured image. The apparatus comprises means for, based on a result of the comparison, determining, by a pose error network, a correction to the observed position, the observed pose, or both.

BRIEF DESCRIPTION OF THE DRAWINGS

Figure 1:
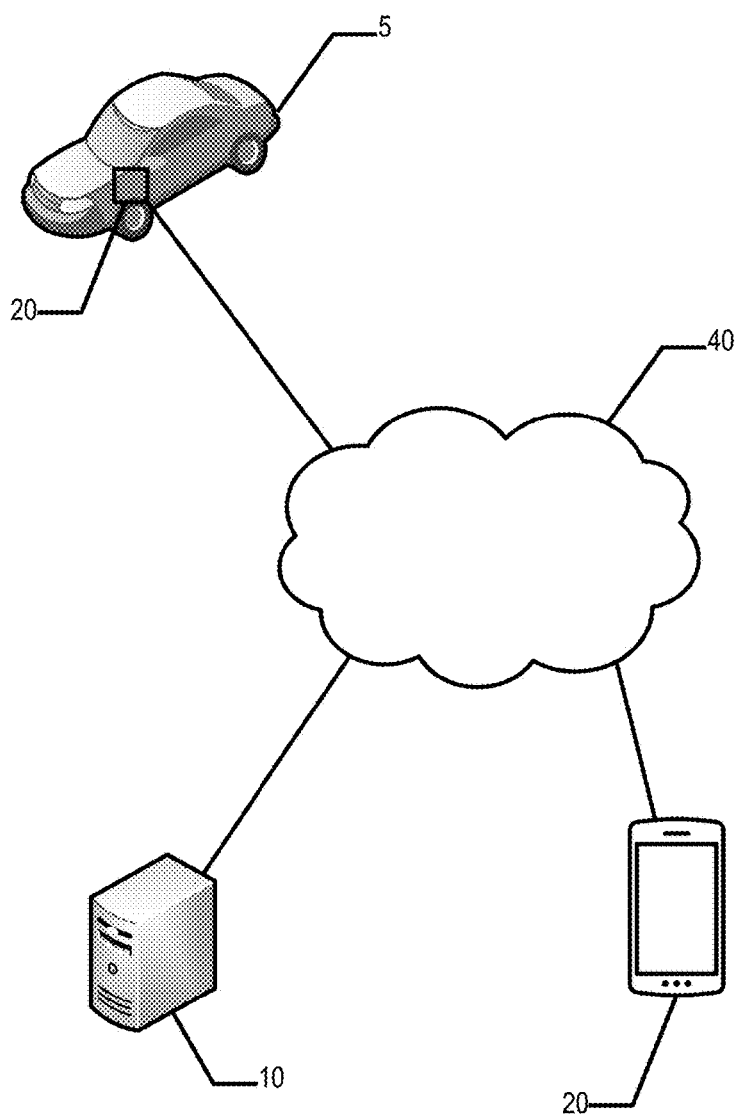
Figure 2A:
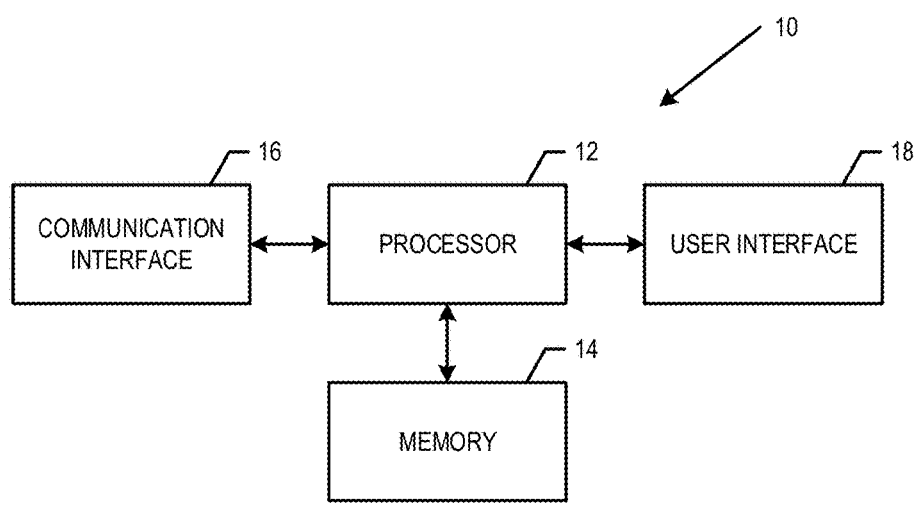
Figure 2B:
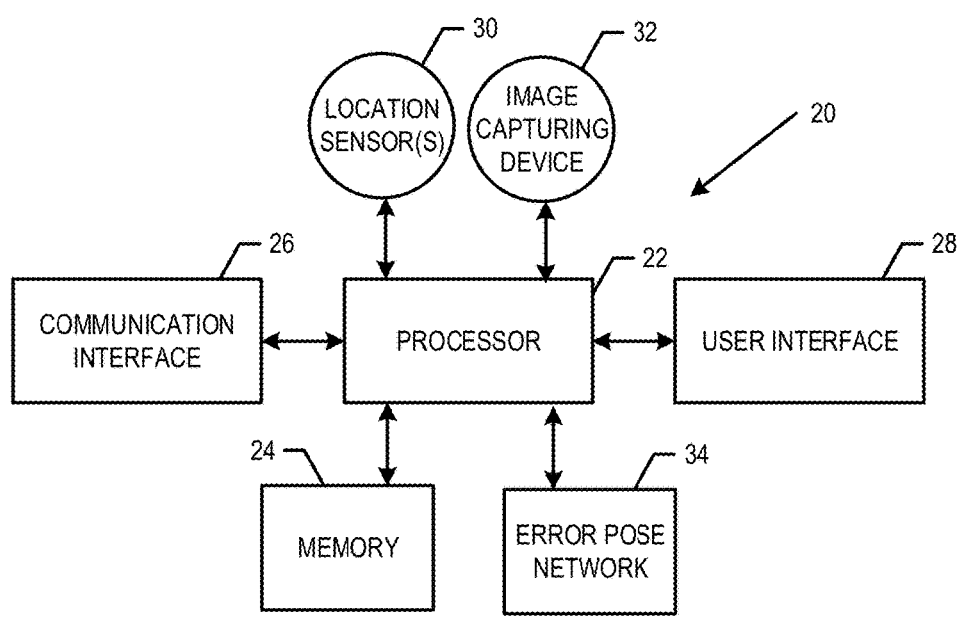

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a remote apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the remote apparatus of FIG. 2A or the vehicle apparatus of FIG. 2B to train the pose error network, in accordance with an example embodiment;

FIG. 4 is a flowchart illustrating operations performed, such as by the remote apparatus of FIG. 2A or the vehicle apparatus of FIG. 2B, in accordance with an example embodiment;

FIG. 5A is a is an example image captured by the vehicle apparatus of FIG. 2B, in accordance with an example embodiment;

FIG. 5B is an example reference image generated by the remote apparatus 2A or the vehicle apparatus of FIG. 2B, in accordance with an example embodiment;

FIG. 5C shows the example reference image shown in FIG. 5B overlaid on the example image shown in FIG. 5A; and FIG. 6 is a flowchart illustrating operations performed, such as by the remote apparatus of FIG. 2A or the vehicle apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

Methods, apparatus and computer program products are provided in accordance with an example embodiment in order to provide efficient and accurate localization in real time or near real time. For example, the position and pose of a vehicle and/or a vehicle apparatus may be determined. Certain example embodiments are configured to provide efficient and accurate localization by determining a correction to an observed position and/or pose that is determined based on Global Positioning System (GPS), inertial measurement unit(s) (IMU), other position determining systems, or a combination thereof. In at least some example embodiments, the correction to the observed position and/or pose is determined based on an implicit comparison of a captured image comprising multi-channel color information/data and a binary two dimensional projection generated based on the observed position and/or pose by a trained deep net/neural network. For example, an observed position and/or pose may be determined. Based on a database of ground truth features, a reference image may be generated. Meanwhile, an image may be captured. Based on the reference image, features within the captured image may be identified. Based on the difference in position and/or pose of the features within the reference image and the features identified in the captured image, a correction to the observed position and/or pose is determined.

FIG. 1 provides an illustration of an example system that can be used in conjunction with various embodiments of the present invention. As shown in FIG. 1, the system may include one or more vehicle apparatuses 20, one or more remote apparatuses 10, one or more networks 50, and/or the like. In various embodiments, the vehicle apparatus 20 may be an in vehicle navigation system, vehicle control system, a mobile computing device, and/or the like. For example, a vehicle apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle 5, assist in control of a vehicle 5, and/or the like.

In an example embodiment, a remote apparatus 10 may comprise components similar to those shown in the example remote apparatus 10 diagrammed in FIG. 2A. In an example embodiment, the remote apparatus 10 is configured to provide map updates, reference image information/data, and/or the like to the vehicle apparatus 20. In an example embodiment, a vehicle apparatus 20 may comprise components similar to those shown in the example vehicle apparatus 20 diagrammed in FIG. 2B. In various embodiments, the remote apparatus 10 may be located remotely from the vehicle apparatus 20. Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a vehicle apparatus 20 may be in communication with a remote apparatus 10 via the network 40. For example, the vehicle apparatus 20 may communicate with the remote apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map from the remote apparatus 10.

In an example embodiment, as shown in FIG. 2B, the vehicle apparatus 20 may comprise a processor 22, memory 24, a communications interface 26, a user interface 28, one or more location sensors 30 (e.g., a location sensor such as a GPS sensor; IMU sensors, and/or the like), one or more image capturing devices (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that identifies the correspondence between (a) the position of the vehicle 5 and the position of the location sensor 30, (b) the position of the location sensor 30 and the image capturing device 32, (c) the pose of the vehicle 5 and the field of view of the image capturing device 32, and/or the like. In an example embodiment, the vehicle apparatus may further comprise a pose error network 34 that has been trained to determine a difference in pose between two images comprising similar features. For example, the pose error network 34 may be trained to compare an image captured by the image capturing device 32 to a reference image that is generated based on a pose of the vehicle 5 observed by the location sensors 30 and determine the error in the observed pose based thereon. In example embodiments, the pose error network 34 may operate on a central processing unit (CPU) or a graphics processing unit (GPU) of the vehicle apparatus 20.

Similarly, as shown in FIG. 2A, the remote apparatus 10 may comprise a processor 12, memory 14, a user interface 18, a communications interface 16, and/or other components configured to perform various operations, procedures, functions or the like described herein. Certain example embodiments of the vehicle apparatus 20 and the remote apparatus 10 are described in more detail below with respect to FIGS. 2A and 2B.

II. Example Operation

In at least some example embodiments, an implicit comparison of a captured image comprising multi-channel color information/data and a binary two dimensional projection generated based on the observed position and/or pose by a trained deep net/neural network is used to determine a correction to an observed position and/or pose of a vehicle 5 and/or vehicle apparatus 20 onboard the vehicle 5. For example, one or more location sensors 30 of the vehicle apparatus 20 may be used to determine an observed position and/or pose of a vehicle 5 and/or vehicle apparatus 20. In an example embodiment, the observed position (or location which is used interchangeably herein) may comprise geospatial coordinates (e.g., latitude and longitude, and/or the like) that are expected to represent the current physical location of the vehicle 5 and/or the vehicle apparatus 20 on board the vehicle 5. In an example embodiment, the observed pose may comprise an angle describing the direction the vehicle 5 is expected to be currently facing and/or heading with respect to a reference direction. For example, the observed pose may comprise the expected angle between a reference direction (e.g., North and/or the like) and the direction in which the front of the vehicle 5 is directed.

A reference image may be accessed and/or generated based on the observed position and/or pose by the remote apparatus 10 and/or the vehicle apparatus 20. For example, the reference image may be a binary map and/or the like generated based on reference static feature information/data corresponding to one or more ground truth features located near the observed position and/or pose. For example, the reference image may provide an expected view of one or more reference static features from the observed position and/or pose.

Before, after, and/or simultaneous to determining the observed position and/or pose and/or accessing and/or generating the reference image, an image capturing device 32 of the vehicle apparatus 20 may capture one or more images. The pose error network 34 may compare the captured image and the reference image. Based on the comparison of the captured image to the reference image, a correction to the observed position and/or pose is determined. Therefore, a direct pose regression may be performed to determine a correction to the observed position and/or pose without requiring explicit detection of features within the captured image. Thus, an accurate corrected position and/or pose for the vehicle 5 and/or vehicle apparatus 20 on board the vehicle may be determined in real time (or near real time). Moreover, while described in conjunction with real time or near real time application, some example embodiments may be implemented in other scenarios.

Training the Pose Error Network

FIG. 3 provides a flowchart illustrating a process of training the pose error network 34. In an example embodiment, the remote apparatus 10 may train a pose error network and the weights and/or parameters of the trained pose error network may be provided to the pose error network 34 of the vehicle apparatus 20. Starting at block 302, one or more known images and the corresponding pose information/data are accessed. A known image is an image having known pose information/data indicating the pose from which the image was captured associated therewith. For example, the ground truth pose may be known for the known image. For example, the apparatus 10 may access one or more known images and the corresponding pose information/data. For example, the apparatus 10 may comprise means, such as processor 12, memory 14, communications interface 16, and/or the like, for accessing known images and the corresponding pose information/data.

At block 304, one or more training images are generated based on a known image and a simulated pose error. For example, the remote apparatus 10 may generate one or more training images providing a view that is similar to the known image, but including a simulated pose error. For example, the remote apparatus 10 may comprise means, such as the processor 12 and/or the like, for generating one or more training images. For example, a training image may be generated with a simulated pose error incorporated therein. In an example embodiment, a training image is not generated. Rather the known image is used as the training image and a synthetic error is introduced to the known pose information/data for the known image.

At block 306, one or more training images are provided to the pose error network for training. For example, the remote apparatus 10 may provide one or more training images to the pose error network for training. For example, the remote apparatus 10 may comprise means, such as the processor 12, communications interface 16, and/or the like, for providing one or more training images to the pose error network for training. In an example embodiment, the corresponding known images may also be provided to the pose error network for training. In an example embodiment, a corresponding comparison image is provided to the pose error network for training. The comparison image is a two dimensional projection of a three dimensional feature map from the known pose of the known image. In example embodiments wherein the known image is used as the training image and synthetic error is introduced into the known pose information/data, the comparison image may be generated based on the synthetic error. In an example embodiment, the pose error network is trained using a supervised training technique.

At block 308, the pose error network may be trained by comparing a training image and the corresponding known image and/or the corresponding comparison image and determining the relative difference in pose (e.g., the simulated pose error). In example embodiments, the pose error network may implicitly compare the training image and the corresponding known image and/or the corresponding comparison image. For example, the pose error network may comprise one or more nodes for comparing a training image and the corresponding known image and/or corresponding comparison image. In example embodiments, the comparison image may be a binary projection. The training image may be a multi-modal image. For example, the training image and the known image may include red, green, blue; cyan, magenta, yellow, black; and/or other multi-channel color scheme information/data. Based on the result of the comparison, the pose error network may determine the relative pose difference between the training image and the known image/comparison image. It may then be determined if the determined relative pose difference is equivalent and/or approximately equivalent to the known simulated pose error for the training image.

The process of providing a training image and the corresponding known image/comparison image to the pose error network for comparison and relative pose difference determination may be continued until the pose error network has been sufficiently trained. For example, the pose error network may be trained until the network weights and/or parameters have converged. Once the network weights and/or parameters have converged, they may be provided (e.g., transmitted), for example by the remote apparatus 10 (e.g., using the communications interface 16), to one or more vehicle apparatuses 20 (e.g., to the communications interface 26). The network weights and/or parameters may then be used by the pose error network 34 of the vehicle apparatus 20.

Determining a Correction to the Observed Position and/or Pose

FIG. 4 provides a flowchart illustrating a process that may be completed, for example, by the vehicle apparatus 20, to provide an accurate position and/or pose of a vehicle 5 and/or vehicle apparatus 20 on board the vehicle 5. Starting at block 102, an observed position and/or pose of the vehicle 5 and/or vehicle apparatus 20 is determined. For example, the vehicle apparatus 20 may determine an observed position and/or pose of the vehicle 5 and/or vehicle apparatus 20. For example, the vehicle apparatus 20 may comprise means, such as location sensor(s) 30 (e.g., GPS and/or IMU sensors) and/or the like, for determining an observed position and/or pose of the vehicle 5 and/or the vehicle apparatus 20 onboard the vehicle 5. In an example embodiment, the observed position (or location which is used interchangeably herein) may comprise geospatial coordinates (e.g., latitude and longitude, and/or the like) that are expected to represent the current physical location of the vehicle 5 and/or the vehicle apparatus 20 on board the vehicle 5. In an example embodiment, the observed pose may be comprise an angle describing the direction the vehicle 5 is expected to be currently facing and/or heading with respect to a reference direction. For example, the observed pose may comprise the expected angle between a reference direction (e.g., North and/or the like) and the direction in which the front of the vehicle 5 is directed.

At block 104, a reference image may be generated and/or accessed. For example, the vehicle apparatus 20 may generate and/or access a reference image. For example, the vehicle apparatus 20 may comprise means, such as processor 22 and/or the like, for generating and/or accessing a reference image. For example, the vehicle apparatus 20 may access static reference information/data from a static feature database or library. The static feature information/data may then be used to generate the reference image. For example, the reference image may be generated based on the observed pose. For example, the reference image may be generated to simulate an image taken at the observed location and at the observed pose. For example, the static feature information/data may be used to generate and/or render a three dimensional feature map, a two dimensional projection of the three dimensional feature map may be generated and/or rendered from the perspective of the observed location and/or pose to provide the reference image. In an example embodiment, one or more parameters, features, or characteristics of the image capture device 32 may be taken into account when generating the reference image. For example, parameters or characteristics relating to the lens, shutter speed, aperture, light sensitivity, and/or the like of the image capture device 32 may be accounted for when generating the reference image. For example, one or more parameters or characteristics of the image capture device 32 that may cause warping of an image captured by the image capture device 32 may be taken into account with a generating the two dimensional projection of the reference image from the three dimensional feature map.

In an example embodiment, the reference image information/data may comprise information/data corresponding to a plurality of reference static features. The reference image information/data may comprise three dimensional geometry information/data for each of the reference static features, location and/or orientation information/data for each of the reference static features, and/or the like. For example, the reference static feature information/data may comprise an array describing the size, three dimensional shape, location, orientation, and/or the like of the reference static feature. In an example embodiment, the reference static features are ground truth features. For example, the location, orientation, and/or three dimensional geometry information/data corresponding to a reference static feature may be determined through direct observation. Co-pending U.S. patent application Ser. No. 15/355,727, filed Nov. 18, 2016 and titled "Detection Of Invariant Features For Localization," provides an example of a static feature information/data library, database, or repository, and is incorporated by reference herein in its entirety.

In an example embodiment, the static feature information/data may be stored in association with a digital map. For example, the remote apparatus 10 may determine and provide a library, database, or repository of static feature information/data. For example, the static feature information/data corresponding to one or more reference static features may be used to generate the reference image. The reference static features may comprise a ground truth features. In an example embodiment, the static feature information/data is organized into tiles and/or stored in association with and/or as part of a digital map. For example, a map tile of a digital map may comprise static feature information/data for one or more static features located within the map tile.

For example, a map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population or feature density within the map region, and/or the like. In an example embodiment, reference image information/data is organized such that reference image information/data corresponding to reference static features located with a particular tile is stored in association with the map information/data for the particular tile. For example, the map information/data for a tile may comprise reference image information/data for reference static features located within the tile. In an example embodiment, accessing and generating the reference image may comprise selecting one or more reference static features that are associated with a tile based on the observed position and/or pose. The reference static feature information/data corresponding to the selected reference static features may be accessed and the reference image may be generated therefrom by applying the observed position and/or pose. For example, the reference image may be a two dimensional projection of the reference static features expected to be viewable at the observed position and from the observed pose.

FIG. 5B shows an example reference image 60. In an example embodiment, the reference image 60 is a binary map. In some example embodiments, the reference image is a multi-channel representation of one or more reference static features. For example, the reference image 60 may comprise one or more reference static features 64, 66. The reference static features 64, 66 may be ground truth features. In an example embodiment, the reference static features 64, 66 may be landmarks in the area, such as building facades, windows, doors, signs, lamp posts, lane lines, man holes, guard rails tagged with their locations, geological features, and/or the like. In some embodiments, the reference static features 64, 66 may comprise features that are not noticeable by the human eye. In an example embodiment, the reference static features 64, 66 may comprise features within the road surface, and/or any other computer detectable feature that is expected to not change significantly over the course of a few days, few weeks, a few months, and/or a few years.

Continuing with FIG. 4, at block 106, an image is captured. For example, the vehicle apparatus 20 may capture an image. For example, the vehicle apparatus 20 may comprise means, such as image capturing device 32, processor 22, and/or the like, for capturing an image. The captured image may be an image, video, and/or the like of the surroundings of the vehicle 5 and/or vehicle apparatus 20. The captured image may comprise one or more features. FIG. 5A illustrates an example captured image 50. The captured image 50 may comprise one or more static features 54, 56, and/or one or more non-static features 52. In example embodiments, the captured image may comprise red, green, blue (RGB); cyan, yellow, magenta, and black (cymk), or other multi-channel color information/data.

Returning to FIG. 4, at block 108, the reference image and the captured image may be compared. For example, the vehicle apparatus 20 may compare the reference image and the captured image. For example, the vehicle apparatus 20 may comprise means, such as processor 22, pose error network 34, and/or the like, for comparing the reference image and the captured image. For example, the reference image and the captured image may be compared by the pose error network 34 to determine how the static features in the reference image align with the captured image. In example embodiments, the captured image may be implicitly compared to the reference image by the pose error network 34. For example, the pose error network 34 may be a trained relative pose regression neural network and the vehicle apparatus 20 may use the pose error network 34 to compare a captured RGB (or other multi-channel color) image and the projected binary map that is the reference image. For example, as shown in FIG. 5C, the reference image 60 may be compared to the captured image 50. For example, the missregistration between the static features 64 and 66 in the reference image 60 and the corresponding static features 54 and 56 in the captured image 50 may be determined. As shown in FIG. 5C, the captured image 50 may comprise RGB, cymk, or other multi-channel color information and the reference image 60 may be a binary two dimensional projection of a three dimensional feature map. As the reference image is generated to provide a view of the surroundings of the vehicle 5 and/or the vehicle apparatus 20 from the observed position and pose, the location and orientation of the reference static features in the reference image will be similar to the location and orientation of the static features in the captured image. Thus, the static features in the captured image need not be explicitly identified. Rather the alignment between the captured image and the reference image may be used to determine the missregistration between the reference static features and the static features present in the captured image.

For example, FIG. 5C shows the reference image 60 overlaid on the captured image 50. As can be seen from FIG. 5C, the correspondence between static feature 54 and reference static feature 64 is easily determined without actively requiring identification of the static feature 54. Therefore, the missregistration between the captured image and the reference image may be quickly determined. In example embodiments, the reference image and the captured image may be compared (or implicitly compared) and, due to an error in the observed location, the reference image and the captured image may be misaligned. For example, a static feature in the reference image may be translated with respect to a corresponding static feature in the captured image. The misalignment between the reference image and the captured image may be used to determine a correction to the observed position. In an example embodiment, a corrected position may be determined based on the correction to the observed position and the observed position and an updated reference image may be generated based on the corrected position. The correction to the observed pose may then be determined by comparing (or implicitly comparing) the captured image to the updated reference image.

Continuing with FIG. 4, at block 110, a correction to the observed position and/or pose of the vehicle 5 and/or the vehicle apparatus 20 may be determined. For example, the vehicle apparatus 20 may determine a correction to the observed position and/or pose. For example, the vehicle apparatus 20 may comprise means, such as the processor 22, pose error network 34, and/or the like, for determining a correction to the observed position and/or pose of the vehicle 5 and/or vehicle apparatus 20. For example, based on the comparison of the captured image and the reference image, the pose error network 34 may determine the missregistration and/or relative pose difference between the reference image and the captured image. In an example embodiment, the correction is determined based on the result of the comparison and/or alignment of the reference image and the captured image. For example, the correction may be determined based on the missregistration and/or relative pose difference between the reference image and the captured image. For example, the pose error may be equal in magnitude to the missregistration and/or relative pose difference between the reference image and the captured image.

Once the correction to the observed position and/or pose is determined, the vehicle apparatus 20 may apply the correction to the observed position and/or pose to determine the corrected location and/or pose of the vehicle 5 and/or vehicle apparatus 20. The corrected location and/or pose may then be provided through an output device of the vehicle apparatus 20 (e.g., a display of the user interface 28, and/or the like), communicated to another computing entity (e.g., the remote apparatus 10), and/or used as input to one or more processes executed by the vehicle apparatus 20 that require an accurate determination of the vehicle and/or vehicle apparatus's location and/or pose. For example, the corrected location and/or pose may be used as input to one or more processes used to autonomously drive the vehicle 5 and/or assist in driving the vehicle 5 (e.g., route planning and/or the like). For example, the vehicle apparatus 20 may make one or more route planning decisions and operate the vehicle 5 in accordance therewith based on the corrected location and/or pose.

Thus, an accurate, real time (or near real time) determination of the location and/or pose of the vehicle 5 and/or vehicle apparatus 20 may be determined. In an example embodiment, the location of the vehicle 5 and/or vehicle apparatus 20 on board the vehicle 5 may be determined to within a predefined positional accuracy, such as an accuracy of 10 centimeters. In certain example embodiments, the pose of the of the vehicle 5 and/or vehicle apparatus 20 on board the vehicle may be determined to within a predefined accuracy, such as an accuracy of two degrees. Thus, in an example embodiment, the location and/or pose of the vehicle 5 and/or vehicle apparatus 20 may be determined with an accuracy that enables and/or facilitates autonomous operation of the vehicle 5. Various predefined positional and pose accuracies may be used in various embodiments, as appropriate for the application.

In some example embodiments, two or more captured images may be used to determine a correction of the observed position and/or pose of the vehicle 5 and/or vehicle apparatus 20. For example, two or more captured images may be used to generate a captured three dimensional image and/or to determine the location and/or orientation of one or more static features in the surroundings of the vehicle 5 and/or vehicle apparatus 20 in three dimensions. For example, two or more images may be captured by the image capturing device 32 that substantially overlap. Two or more images may substantially overlap if at least one static feature is present and/or identifiable in each of the two or more images. Three dimensional information/data for one or more static references identified in the two or more captured images may be determined based on the two or more images. In an example embodiment, determining the correction to the pose may be more efficient and/or more accurate when three dimensional information/data is used to describe one or more static features identified in the captured images.

Alternative Method for Determining a Correction to the Observed Position and/or Pose FIG. 6 provides a flowchart illustrating processes and procedures that may be completed by a vehicle apparatus 20 to perform localization of a vehicle 5 and/or vehicle apparatus 20. Starting at block 202, an observed position and/or pose of the vehicle 5 and/or vehicle apparatus 20 is determined. For example, the vehicle apparatus 20 may determine an observed position and/or pose of the vehicle 5 and/or vehicle apparatus 20. For example, the vehicle apparatus 20 may comprise means, such as location sensor(s) 30 (e.g., GPS and/or IMU sensors) and/or the like, for determining an observed position and/or pose of the vehicle 5 and/or the vehicle apparatus 20 onboard the vehicle 5.

At block 204, a reference image may be generated and/or accessed. For example, the vehicle apparatus 20 may generate and/or access a reference image. For example, the vehicle apparatus 20 may comprise means, such as processor 22 and/or the like, for generating and/or accessing a reference image. For example, as described above, the vehicle apparatus 20 may access static feature information/data from a reference static feature library, database, or repository. In an example embodiment, the static feature information/data is stored as part of a map tile of a digital map. The static feature information/data may then be used to generate the reference image. In an example embodiment, the reference image is a three dimensional image. For example, the reference image may be a three dimensional feature map based on the static feature information/data. In an example embodiment, the reference image a binary three dimensional feature map. In an example embodiment, the reference image is generated based on the observed position and/or pose. For example, the reference image may be an expected view of one or more static features at the observed position and/or pose. In an example embodiment, the reference image may be a three dimensional feature map. The feature map may be a binary feature map or a multi-channel feature map.

At block 206, a first image is captured. For example, the vehicle apparatus 20 may capture a first image. For example, the vehicle apparatus 20 may comprise means, such as image capturing device 32, processor 22, and/or the like, for capturing a first image. The first captured image may be an image, video, and/or the like of the surroundings of the vehicle 5 and/or vehicle apparatus 20 onboard the vehicle 5. The first captured image may comprise one or more features. For example, the first captured image may comprise one or more non-static features and one or more static features.

At block 208, one or more static features in the first captured image are identified. For example, the vehicle apparatus 20 may identify one or more static features in the first captured image. For example, that vehicle apparatus 20 may comprise means, such as processor 22 and/or the like, for identifying one or more static features in the first captured image. In an example embodiment, the reference image and the static features therein may be used to guide the identification of the static features in the captured image.

At block 210, at least one second image is captured. For example, the vehicle apparatus 20 may capture one or more second images. For example, the vehicle apparatus 20 may comprise means, such as image capturing device 32, processor 22, and/or the like, for capturing one or more second images. The second captured image may be an image, video, and/or the like of the surroundings of the vehicle 5 and/or vehicle apparatus 20 onboard the vehicle 5. The second captured image may comprise one or more features. For example, the second captured image may comprise one or more non-static features and one or more static features. In at least some example embodiments, the first captured image and the second captured image substantially overlap. For example, at least one static reference is present and/or identifiable in both the first captured image and the second captured image. In an example embodiment, the image capture device 32 may be configured to capture a series of images at a rate of approximately 30 Hz, for example. In an example embodiment, the first and second captured images may be consecutive images in the series of captured images. In example embodiments, a plurality of second images may be captured. For example, in some embodiments, may be small or short (e.g., tenth of a second long, half a second long, one second long, and/or the like) video feed captured by the image capturing device 32.

At block 212, one or more static features in the second captured image may be identified. For example, the vehicle apparatus 20 may identify one or more static features in the second captured image. For example, that vehicle apparatus 20 may comprise means, such as processor 22 and/or the like, for identifying one or more static features in the second captured image. In an example embodiment, the static features in the second image may be identified based on the reference static features in the reference image. In an example embodiment, at least one static feature is identified in the second image that corresponds to a static feature identified in the first image.

At block 214, three dimensional information/data may be determined and/or generated for one or more static features identified in both the first and second captured images. For example, the three dimensional information/data may comprise three dimensional shape information/data for each of static features identified in both the first and second captured images. In some example embodiments, a three dimensional image is generated based on the first and second captured images. For example, a three dimensional image may be generated based on the three dimensional information/data determined and/or generated for the one or more static features identified in both the first and second captured images. For example, the vehicle apparatus 20 may determine and/or generate three dimensional information/data for one or more static features identified in both the first and second captured images. For example, the vehicle apparatus 20 may generate a three dimensional image based on the three dimensional information/data for one or more static features identified in both the first and second captured images. For example, the vehicle apparatus 20 may comprise means, such as processor 22 and/or the like, for determining and/or generating three dimensional information/data for one or more static features identified in both the first and second captured images. For example, the vehicle apparatus 20 may comprise means, such as the processor 22 and/or the like, for generating a three dimensional image based on the three dimensional information/data for one or more static features identified in both the first and second captured images. For example, tie points may be established between the first captured image and the second captured image. The tie points may then be used to determine three dimensional information for one or more static features identified in both the first captured image and the second captured image. As should be understood various techniques may be used to determine the three dimensional information/data for the one or more static features identified in both the first image and the second image based on the first captured image and the second captured image.

At block 216, the generated three dimensional image may be compared to the reference image. For example, the vehicle apparatus 20 may compare the location and/or orientation of the static features in the generated three dimensional image to the location and/or orientation of the reference static features in the reference image. For example, the vehicle apparatus 20 may comprise means, such as the processor 22, pose error network 34, and/or the like, for comparing the location and/or orientation of the static features in the generated three dimensional image to the location and/or orientation of the reference static features in the reference image. In example embodiments, the error pose network 34 may implicitly compare the generated three dimensional image and the reference image. For example, the missregistration and/or relative pose difference between the reference image and the generated three dimensional image may be determined. In some embodiments a three dimensional image may not be generated and the location of the static features within the first and/or second captured images and the three dimensional information/data for the static features may be compared to corresponding information/data for the reference static features.

At block 218, a correction to the observed position and/or pose of the vehicle 5 and/or the vehicle apparatus 20 may be determined. For example, the vehicle apparatus 20 may determine a correction to the observed position and/or pose. For example, the vehicle apparatus 20 may comprise means, such as the processor 22, pose error network 34, and/or the like, for determining a correction to the observed position and/or pose of the vehicle 5 and/or vehicle apparatus 20. In an example embodiment, the correction is determined based on the result of the comparison of the three dimensional image and the reference image. For example, the correction may be determined based on the comparison of the location and/or orientation of the static features identified in the generated three dimensional image to the reference static features in the reference image. For example, the correction may be determined based on the average translation and/or rotation that must be performed to align each of the reference static features in the reference image with the corresponding static features in the generated three dimensional image.

Once the correction to the observed position and/or pose is determined, the vehicle apparatus 20 may apply the correction to the observed position and/or pose to determine the corrected location and/or pose of the vehicle 5 and/or vehicle apparatus 20. The corrected location and/or pose may then be provided through an output device of the vehicle apparatus 20 (e.g., a display of the user interface 28, and/or the like), communicated to another computing entity (e.g., the remote apparatus 10), and/or used as input to one or more processes executed by the vehicle apparatus 20 that require an accurate determination of the vehicle 5 and/or vehicle apparatus's location and/or pose. For example, the corrected location and/or pose may be used as input to one or more processes used to autonomously drive the vehicle 5 and/or assist in driving the vehicle 5.

Thus, an accurate, real time (or near real time) determination of the location and/or pose of the vehicle 5 and/or vehicle apparatus 20 may be determined. In an example embodiment, the location of the vehicle 5 and/or vehicle apparatus 20 on board the vehicle 5 may be determined to within a predefined positional accuracy, such as an accuracy of 10 centimeters. In an example embodiment, the pose of the of the vehicle 5 and/or vehicle apparatus 20 on board the vehicle 5 may be determined to within a predefined accuracy, such as an accuracy of two degrees. Thus, in an example embodiment, the location and/or pose of the vehicle 5 and/or vehicle apparatus 20 may be determined with an accuracy that enables and/or facilitates autonomous operation of the vehicle 5. Various predefined positional and pose accuracies may be used in various embodiments, as appropriate for the application.

In some example embodiments, the process of determining the correction of the position and/or pose of the vehicle 5 and/or vehicle apparatus 20 on board the vehicle 5 is completed by the vehicle apparatus 20. In some example embodiments, the vehicle apparatus 20 may determine the observed position and pose and capture the one or more images. The vehicle apparatus may then provide (e.g., transmit) the observed position and pose and one or more captured images to the remote apparatus 10. The remote apparatus 10 may then identify static features within the captured images and perform the regression to determine the correction to the observed position and/or pose based on the differences in the location and/or orientation of the static features in the captured image(s) compared to the location and/or orientation of the reference static features in the reference image. The remote apparatus 10 may then provide (e.g. transmit) the correction to the position and/or pose or the corrected position and/or pose to the vehicle apparatus 20.

III. Example Apparatus

The vehicle apparatus 20 and/or remote apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts a remote apparatus 10 and FIG. 2B depicts a vehicle apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein. In an example embodiment, the vehicle apparatus 20 may further comprise a pose error network 34. For example, the pose error network may be a trained deep net and/or neural network. For example, network weights and/or parameters for the pose error network 34 may be provided (e.g., transmitted) to the vehicle apparatus 20 by the remote apparatus 10.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The remote apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the vehicle apparatus 20 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

In an example embodiment, reference image information/data is stored in association with the map information/data. For example, the geographic database may further comprise a database, library, and/or the like of reference static feature information/data that is stored in association with the map information/data. For example, in some embodiments, reference static feature information/data corresponding to static features located within a particular map tile is stored as part of (e.g., as a layer, associated map information/data, and/or the like) of the particular map tile.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the remote apparatus 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3, 4, and 6 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining an observed position and an observed pose of a vehicle;
   generating a reference image based on the observed position and observed pose, wherein (a) the reference image comprises one or more reference static features and (b) the reference image is generated from the perspective of the observed position and the observed pose;
implicitly comparing the reference image to a captured image using a pose error network to determine a misalignment between at least one feature of the reference image and a corresponding feature of the captured image, wherein the pose error network comprises a trained neural network; and
based on the determined misalignment, determining, by the pose error network, a correction to the observed position, the observed pose, or both.

2. The method according to claim 1, wherein the reference image comprises a binary map that is a two dimensional projection of a three dimensional feature map at the observed position and observed pose.

3. The method according to claim 1, wherein the observed position and observed pose are determined based on a position and pose determined by a global positioning system (GPS), a position and pose determined by an inertial measurement unit (IMU), or a combination thereof.

4. The method according to claim 1, wherein the reference image is generated based on reference static feature information that comprises ground truth information for one or more reference static features.

5. The method according to claim 1, wherein generating the reference image comprises:
selecting one or more reference static features from a plurality of reference static features stored in association with a map tile of a digital map based on the observed position, observed pose, or both;
accessing reference static feature information corresponding to the selected reference static features from the map tile;
generating a three dimensional feature map based on the accessed reference static feature information; and
generating the reference image, wherein the reference image is a two dimensional projection of the three dimensional feature map based on the observed position, observed pose, or both.

6. The method according to claim 1, wherein the captured image comprises multi-channel color information.

7. The method according to claim 1, further comprising:
identifying one or more static features within the captured image;
identifying at least one of the one or more static features within at least one second captured image;
generating three dimensional information corresponding to the at least one static feature identified in both the captured image and the second captured image based at least in part on the captured image and the second captured image; and
generating a three dimensional image based at least in part on the three dimensional information, and
determining, by the pose error network, a correction to the observed position, the observed pose, or both based on implicitly comparing the generated three dimensional image and the reference image.

8. An apparatus comprising at least one processor, at least one memory storing computer program code, and a pose error network, the at least one memory and the computer program code configured to, with the processor, cause the apparatus to at least:
determine an observed position and an observed pose of a vehicle;
generate a reference image based on the observed position and observed pose, wherein (a) the reference image comprises one or more reference static features and (b) the reference image is generated from the perspective of the observed position and the observed pose;
implicitly compare the reference image to a captured image using the pose error network to determine a misalignment between at least one feature of the reference image and a corresponding feature of the captured image, wherein the pose error network comprises a trained neural network; and
based on the determined misalignment, determine, by the pose error network, a correction to the observed position, the observed pose, or both.

9. The apparatus according to claim 8, wherein the reference image comprises a binary map that is a two dimensional projection of a three dimensional feature map at the observed position and observed pose.

10. The apparatus according to claim 8, wherein the observed position and observed pose are determined based on a position and pose determined by a global positioning system (GPS), a position and pose determined by an inertial measurement unit (IMU), or a combination thereof.

11. The apparatus according to claim 8, wherein the reference image is generated based on reference static feature information that comprises ground truth information for one or more reference static features.

12. The apparatus according to claim 8, wherein to generate the reference image the at least one memory and the computer program code are configured to, with the processor, cause the apparatus to at least:
select one or more reference static features from a plurality of reference static features stored in association with a map tile of a digital map based on the observed position, observed pose, or both;
access reference static feature information corresponding to the selected reference static features from the map tile; and
generate a three dimensional feature map based on the accessed reference static feature information; and
generate the reference image, wherein the reference image is a two dimensional projection of the three dimensional feature map based on the observed position, observed pose, or both.

13. The apparatus according to claim 8, wherein the captured image comprises multi-channel color information.

14. The apparatus according to claim 9, wherein the at least one memory and the computer program code are further configured to, with the processor, cause the apparatus to at least:
identify one or more static features within the captured image;
identify at least one of the one or more static features within at least one second captured image;
generate three dimensional information corresponding to the at least one static feature identified in both the captured image and the second captured image based at least in part on the captured image and the second captured image; and
generate a three dimensional image based at least in part on the three dimensional information; and
determine, by the pose error network, a correction to the observed position, the observed pose, or both based on implicitly comparing the generated three dimensional image and the reference image.

15. A computer program product comprising at least one non-transitory computer-readable storage medium having computer-executable program code instructions stored therein, the computer-executable program code instructions comprising program code instructions configured to:

determine an observed position and an observed pose of a vehicle;

generate a reference image based on the observed position and observed pose, wherein (a) the reference image comprises one or more reference static features and (b) the reference image is generated from the perspective of the observed position and the observed pose;

implicitly compare the reference image to a captured image using a pose error network to determine a misalignment between at least one feature of the reference image and a corresponding feature of the captured image, wherein the pose error network comprises a trained neural network; and based on the determined misalignment, determine, by the pose error network, a correction to the observed position, the observed pose, or both.

16. The computer program product according to claim 15, wherein the reference image comprises a binary map that is a two dimensional projection of a three dimensional feature map at the observed position and observed pose.

17. The computer program product according to claim 15, wherein the observed position and observed pose are determined based on a position and pose determined by a global positioning system (GPS), a position and pose determined by an inertial measurement unit (IMU), or a combination thereof.

18. The computer program product according to claim 15, wherein the reference image is generated based on reference static feature information that comprises ground truth information for one or more reference static features.

19. The computer program product according to claim 15, wherein the computer-executable program code instructions comprise program code instructions configured to generate the reference image by:

selecting one or more reference static features from a plurality of reference static features stored in association with a map tile of a digital map based on the observed position, observed pose, or both;

accessing reference static feature information corresponding to the selected reference static features from the map tile; and generating a three dimensional feature map based on the accessed reference static feature information; and generating the reference image, wherein the reference image is a two dimensional projection of the three dimensional feature map based on the observed position, observed pose, or both.

20. The computer program product according to claim 15, wherein the computer-executable program code instructions further comprise program code instructions configured to:

identify one or more static features within the captured image;

identify at least one of the one or more static features within at least one second captured image;

generate three dimensional information corresponding to the at least one static feature identified in both the captured image and the second captured image based at least in part on the captured image and the second captured image;

generate a three dimensional image based at least in part on the three dimensional information; and determine, by the pose error network, a correction to the observed position, the observed pose, or both based on implicitly comparing the generated three dimensional image and the reference image.

* * * * *